(12) United States Patent
Tajima (10) Patent No.: US 9,042,790 B2
(45) Date of Patent: May 26, 2015

(54) ELECTRONIC APPARATUS AND IMAGE FORMING APPARATUS

(71) Applicant: KYOCERA Document Solutions Inc., Osaka (JP)

(72) Inventor: Shinichi Tajima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/260,108

(22) Filed: Apr. 23, 2014

(65) Prior Publication Data

US 2014/0321866 A1      Oct. 30, 2014

(30) Foreign Application Priority Data

Apr. 27, 2013    (JP) ................................. 2013-094839

(51) Int. Cl.
| | |
|---|---|
| *G03G 15/08* | (2006.01) |
| *H02K 11/00* | (2006.01) |
| *G03G 21/16* | (2006.01) |
| *H02K 7/116* | (2006.01) |

(52) U.S. Cl.
CPC ........ *G03G 21/1647* (2013.01); *H02K 11/0015* (2013.01); *H02K 7/116* (2013.01); *G03G 15/0856* (2013.01)

(58) Field of Classification Search
CPC .......... G03G 15/0832; G03G 15/0834; G03G 15/0865; G03G 15/0868; G03G 15/0877; G03G 15/556; G03G 21/1857
USPC .................................. 399/27, 258; 310/68 B
See application file for complete search history.

(56) References Cited

U.S. PATENT DOCUMENTS

2008/0232836 A1    9/2008  Ishida

FOREIGN PATENT DOCUMENTS

| JP | 2008-233439 A | 10/2008 |
| JP | 2011-133616 A | 7/2011 |

*Primary Examiner* — Erika J Villaluna
(74) *Attorney, Agent, or Firm* — Knobbe, Martens Olson & Bear LLP (57) ABSTRACT

An image forming apparatus includes a driving motor, a gear mechanism including a drive gear rotated by driving force of the driving motor and a slave gear meshed with the drive gear, to transmit the driving force to an object, one of the drive gear and the slave gear including a toothless portion without the gear tooth, formed on a circumferential edge of the corresponding gear, a control unit, a detection unit that detects a driving current for the driving motor when the driving motor is working, a decision unit that decides whether the driving current detected by the detection unit is below a predetermined threshold, and a calculation unit that counts the number of times that the decision unit has decided that the driving current is below the threshold, and calculates an amount of movement of the slave gear on the basis of the number of times counted.

11 Claims, 7 Drawing Sheets

ELECTRONIC APPARATUS AND IMAGE FORMING APPARATUS

INCORPORATION BY REFERENCE

This application claims priority to Japanese Patent Application No. 2013-094839 filed on Apr. 27, 2013, the entire contents of which are incorporated by reference herein.

BACKGROUND

1. Technical Field

The present disclosure relates to an electronic apparatus and an image forming apparatus, and more particularly to a technique of detecting an amount of movement of an object to be rotated by a driving force of a driving motor.

2. Related Art

In electronic apparatuses such as an image forming apparatus that employs an electrophotography method, a developing unit supplies a toner to a static latent image formed on the surface of a photoconductor drum or an intermediate transfer belt, to thereby develop the image. The toner is stored in a toner container, which is driven by a driving motor when the toner density in the developing unit drops, so that the toner in the toner container is stirred with a stirring paddle and supplied to the developing unit with a conveyor screw. Therefore, the amount of the toner supplied to the developing unit can be calculated from the amount of movement of the toner container (conveyor screw). When thus calculating the amount of the toner supplied to the developing unit from the amount of movement of the toner container, the torque of the driving motor has to be taken into account because the amount of movement varies depending on the torque.

Now, in some image forming apparatuses (general apparatus A) the CPU is configured to decide whether the current and torque of the driving motor have largely fluctuated within a predetermined period of time. In the case where the torque has largely fluctuated, i.e., in the case where the toner has been unexpectedly supplied to the developing unit, the CPU stops the supply of the toner from the toner container to the developing unit for a predetermined period of time, and detects the toner density in the developing unit after the predetermined period of time has elapsed and then resumes the regular supply of the toner to thereby properly form the images.

In some other image forming apparatuses (general apparatus B), a rotation speed detector and a current controller are employed when driving a DC servo motor, to calculate the driving torque on the basis of the correlation between the number of rotations and the supply current.

SUMMARY

An aspect of the disclosure proposes further improvement of the foregoing technique.

In an aspect, the disclosure provides an electronic apparatus including a driving motor, a gear mechanism, a control unit, a detection unit, a decision unit, and a calculation unit.

The driving motor generates a rotational driving force.

The gear mechanism includes a drive gear made to rotate by the rotational driving force of the driving motor and a slave gear made to rotate by the rotational driving force of the driving motor by being meshed with the drive gear, to transmit the rotational driving force to an object to be driven by the driving motor, one of the drive gear and the slave gear including a toothless portion where the gear tooth is missing, the toothless portion being formed on a circumferential edge of the corresponding gear.

The control unit controls the driving motor.

The detection unit detects a driving current for the driving motor when the driving motor is activated.

The decision unit decides whether the driving current detected by the detection unit is lower than a predetermined threshold.

The calculation unit counts a number of times that the decision unit has decided that the driving current is lower than the threshold, and calculates an amount of movement of the slave gear on the basis of the number of times counted.

In another aspect, the disclosure provides an image forming apparatus including the foregoing electronic apparatus, an image forming unit, and a toner container.

The image forming unit forms an image based on image data on a recording medium.

The toner container supplies a toner to a developing unit provided in the image forming unit.

A rotating member provided in the toner container for conveying the toner in the toner container to the developing unit is made to rotate as the object to be driven, via the drive gear and the slave gear.

DETAILED DESCRIPTION

Figure 1:
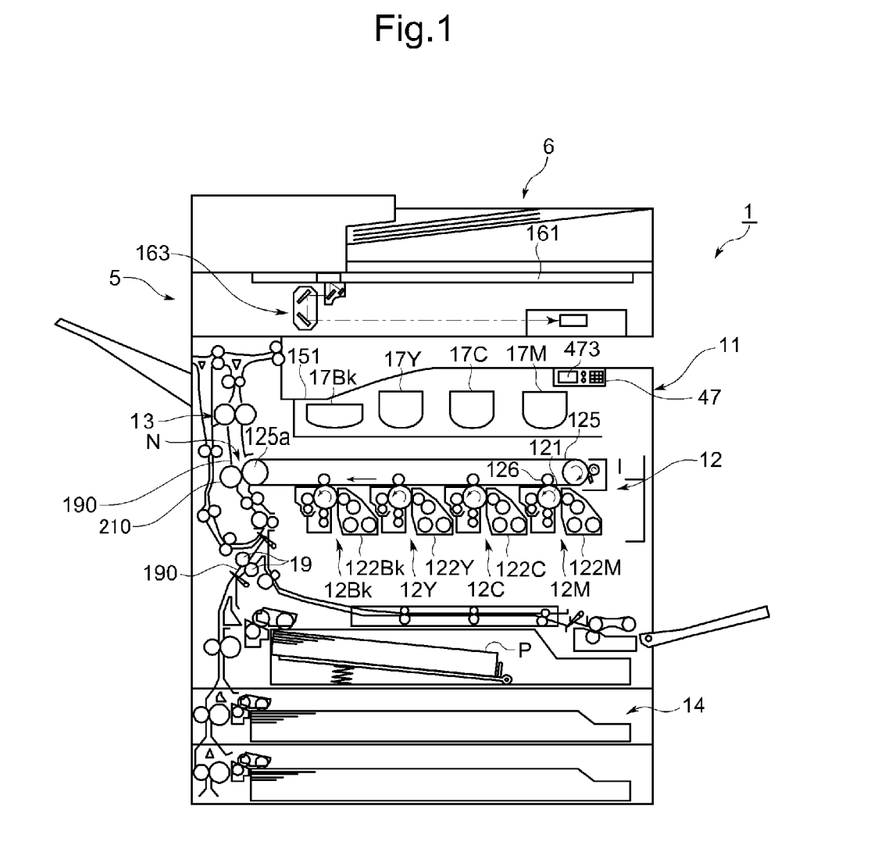
FIG. 1 is a front cross-sectional view showing a configuration of an image forming apparatus according to an embodiment of the disclosure.

Hereafter, an image forming apparatus according to an embodiment of the disclosure will be described with reference to the drawings. FIG. 1 is a front cross-sectional view showing a configuration of the image forming apparatus according to the embodiment of the disclosure.

The image forming apparatus 1 according to the embodiment of the disclosure is a multifunctional peripheral having a plurality of functions such as a copying function, a printing function, a scanning function, and a facsimile function. The image forming apparatus 1 includes a main body 11, in which an operation unit 47, an image forming unit 12, a fixing unit 13, a paper feed unit 14, a document feeding unit 6, and a document reading unit 5 are provided.

The operation unit 47 accepts instructions inputted by a user with respect to the operations and processes that the image forming apparatus 1 is capable of performing, for example an image forming instruction and a document reading instruction. The operation unit 47 includes a display unit 473.

When the image forming apparatus 1 performs the document reading operation, the document reading unit 5 optically reads the image on a source document fed by the document feeding unit 6 or placed on a platen glass 161, and generates image data. The image data generated by the document reading unit 5 is stored in a built-in HDD or a computer connected to a network.

When the image forming apparatus 1 performs the image forming operation, the image forming unit 12 forms a toner image on a paper sheet P, an example of the recording medium in the disclosure, delivered from the paper feed unit 14, on the basis of the image data generated by the document reading operation, the image data received from the computer connected to a network, or the image data stored in the built-in HDD. In the case of color printing, an image forming subunit 12M for magenta, an image forming subunit 12C for cyan, an image forming subunit 12Y for yellow, and an image forming subunit 12Bk for black in the image forming unit 12 each form the toner image on a photoconductor drum 121 based on the image data composed of the corresponding color component, through a charging, exposing, and developing processes, and a primary transfer roller 126 transfers the toner image onto an intermediate transfer belt 125.

The toner images of the respective colors are superposed at an adjusted timing when transferred onto the intermediate transfer belt 125, so as to form a colored toner image. A secondary transfer roller 210 transfers the colored toner image formed on the surface of the intermediate transfer belt 125 onto the paper sheet P transported along a transport route 190 from the paper feed unit 14, at a nip region N of a drive roller 125a engaged with the intermediate transfer belt 125. Then the fixing unit 13 fixes the toner image on the paper sheet P by thermal pressing. The paper sheet P having the colored image formed and fixed thereon is discharged to an output tray 151.

A developing unit 122M in the image forming subunit 12M, a developing unit 122C in the image forming subunit 12C, a developing unit 122Y in the image forming subunit 12Y, and a developing unit 122Bk in the image forming subunit 12Bk serve to develop the respective colors. The developing units 122M, 122C, 122Y, and 122Bk have the same configuration, and in the case where the developing unit is simply numbered as 122 in the subsequent description, one of the developing units 122M, 122C, 122Y, and 122Bk is referred to.

Hereunder, a toner container 17M, a toner container 17C, a toner container 17Y, and a toner container 17Bk will be described. Here, the toner containers 17M, 17C, 17Y, and 17Bk have the same configuration, and in the case where the toner container is simply numbered as 17, one of the toner containers 17M, 17C, 17Y, and 17Bk is referred to.

Figure 2:
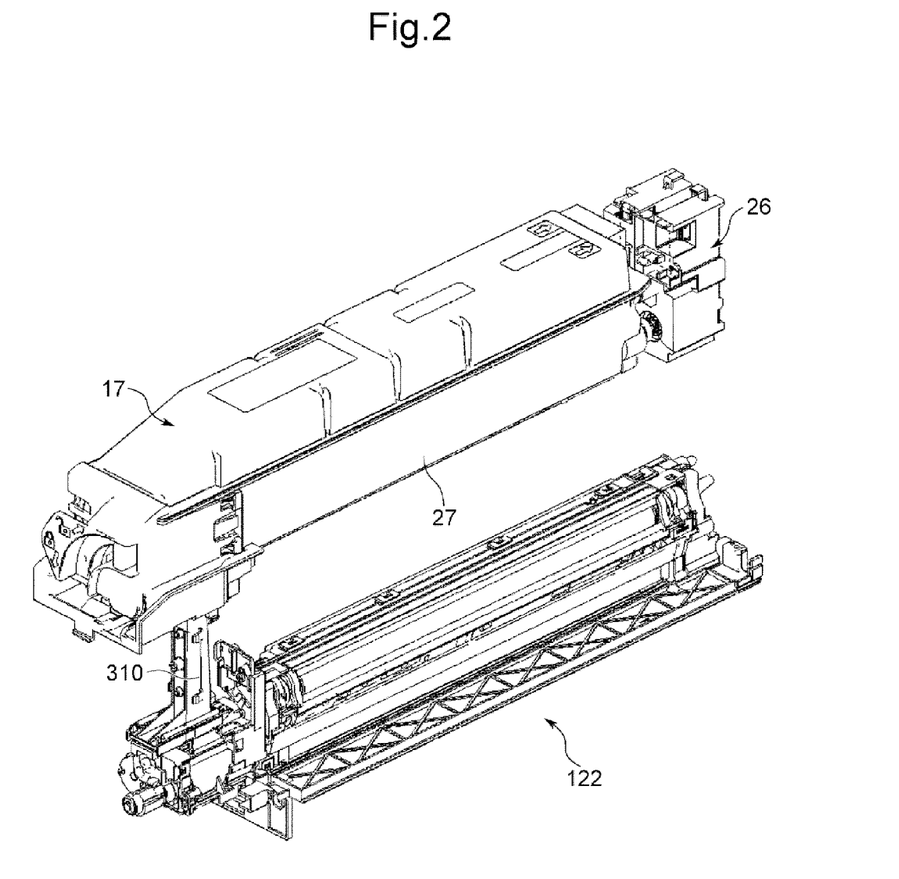
FIG. 2 is a perspective view for explaining connection between a toner container and a developing unit.
Figure 3:
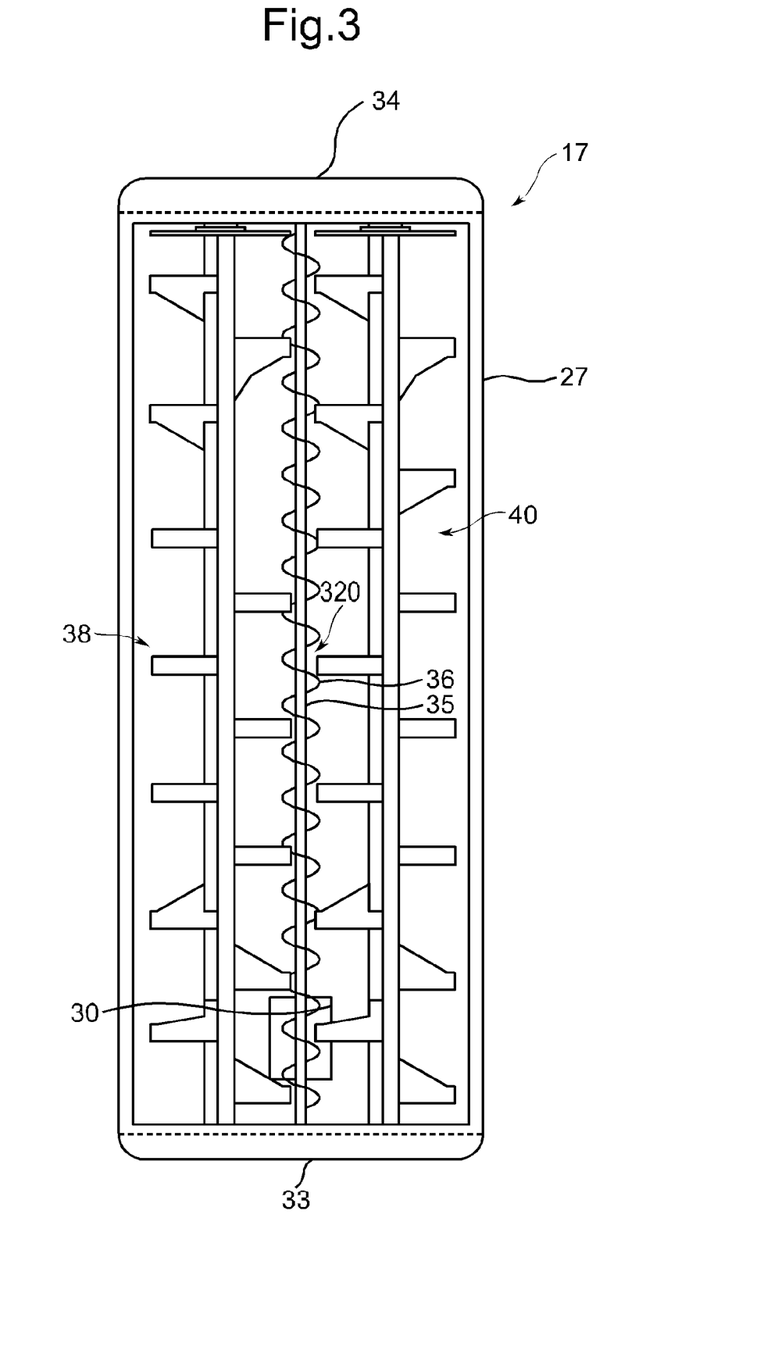
FIG. 3 is a plan view of a toner container with the cover removed.
Figure 4:
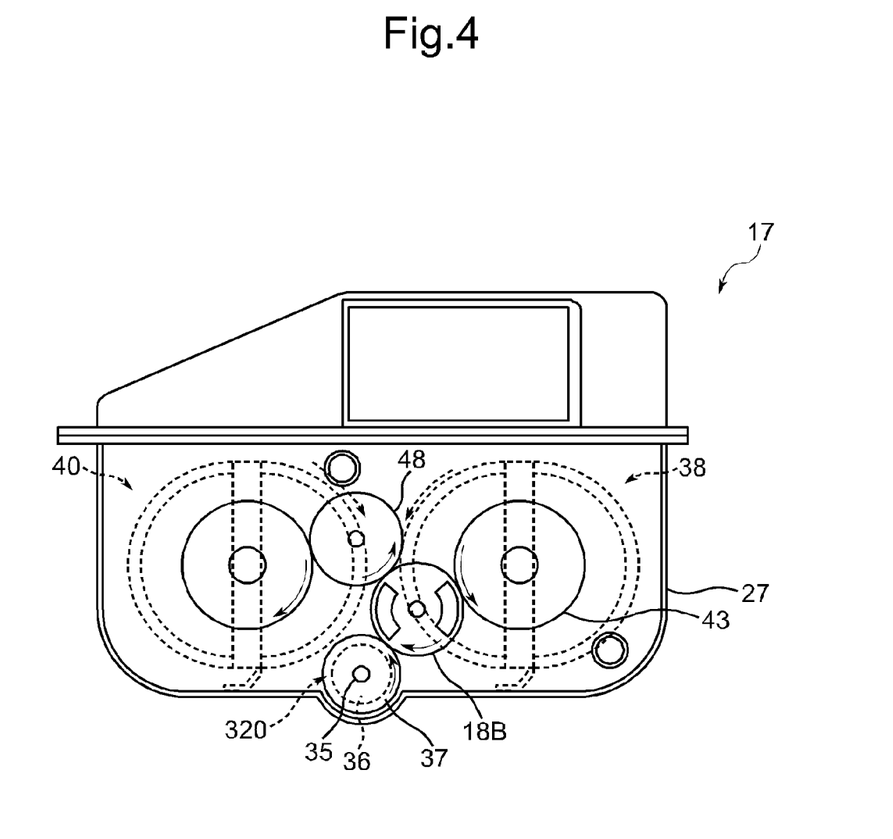
FIG. 4 is a rear view showing a gear mechanism provided in the toner container.
Figure 5:
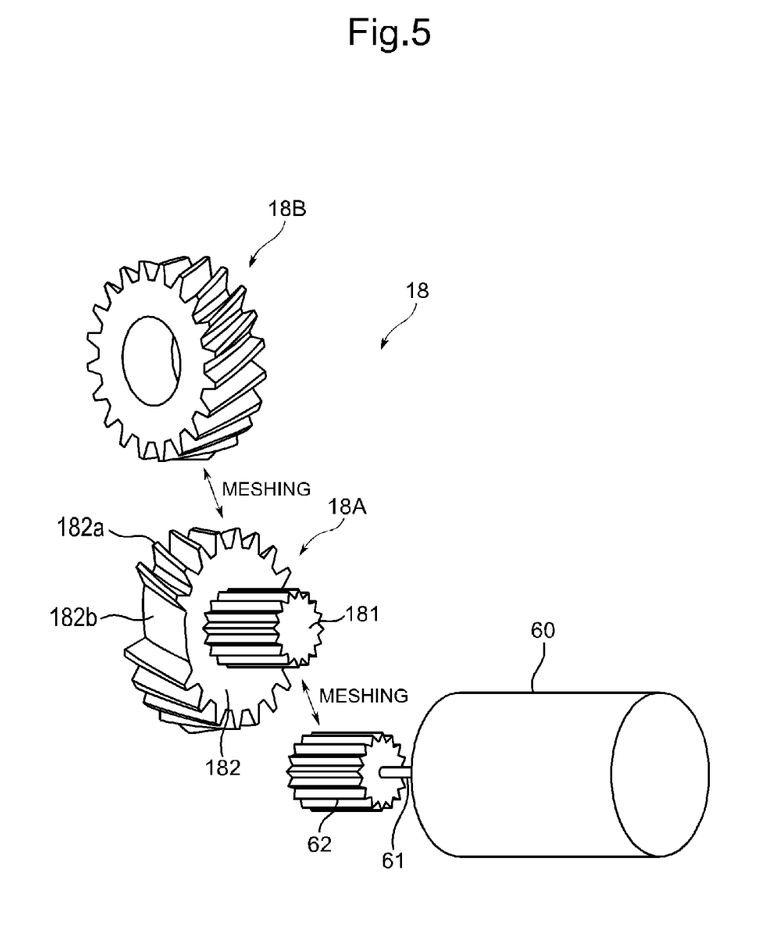
FIG. 5 is an exploded perspective view showing a configuration of an essential portion of the gear mechanism and a driving motor that drive the toner container.

FIG. 2 is a perspective view for explaining connection between the toner container 17 and the developing unit 122. FIG. 3 is a plan view of the toner container 17 with the cover removed. FIG. 4 is a rear view showing a gear mechanism 18 provided in the toner container 17. FIG. 5 is an exploded perspective view showing a configuration of the essential portion of the gear mechanism 18 and a driving motor that drive the toner containers 17M, 17C, 17Y, and 17Bk.

The toner container 17M storing the magenta toner, the toner container 17C storing the cyan toner, the toner container 17Y storing the yellow toner, and the toner container 17Bk storing the black toner are removably mounted on a non-illustrated toner container base in the main body 11, at positions above the developing units 122M, 122C, 122Y, and 122Bk with the intermediate transfer belt 125 disposed therebetween. When the toner runs out, the corresponding one of the toner containers 17M, 17C, 17Y, and 17Bk can be replaced by opening and closing a cover provided on the main body 11.

The toner containers 17M, 17C, 17Y, and 17Bk each include a toner outlet 30 formed in the bottom face (see FIG. 3).

A conveyor screw 320 as a transfer means is rotatably disposed in a container body 27, at an upper position of the toner outlet 30. The conveyor screw 320 includes a rotary shaft 35 having the respective axial end portions supported by the front and rear sidewalls 33, 34 of the container body 27, a spiral fin 36 provided around the rotary shaft 35 concentrically therewith, and a conveying gear 37 (see FIG. 4) located at one of the axial end portion of the rotary shaft 35 (in this embodiment, rear end portion).

In addition, the container body 27 includes a first stirring paddle 38 as a first stirring means rotatably disposed on one side above the conveyor screw 320 (in this embodiment, left upper position), and a second stirring paddle 40 as a second stirring means rotatably disposed on the other side above the conveyor screw 320 (in this embodiment, right upper position).

A container driving unit 26 is located in the rear portion of the main body 11, and removably attached to the toner container 17 (see FIG. 2). The container driving unit 26 includes a driving motor 60 having an output shaft 61, a pinion 62 attached to the end portion of the output shaft 61, and a drive gear 18A meshed with the pinion 62.

The container body 27 also includes a slave gear 18B that rotates interlocked with the rotary shaft 35 supported by the container body 27. The slave gear 18B is meshed with the drive gear 18A engaged with the driving motor 60 when the toner container 17 is mounted in the main body 11. The slave gear 18B is meshed with a gear 43 that rotates interlocked with the rotary shaft of the first stirring paddle 38, a gear 48 that transmits the driving force to the rotary shaft of the second stirring paddle 40, and the conveying gear 37 that rotates interlocked with the rotary shaft of the conveyor screw 320, to thereby transmit the rotational driving force of the driving motor 60 to the first stirring paddle 38, the second stirring paddle 40, and the conveyor screw 320 (see FIG. 4). The drive gear 18A and the slave gear 18B constitute the gear mechanism 18.

The toner outlet 30 is connected to the inside of the corresponding developing unit 122 via a pipe 310 generally vertically disposed in the main body 11 (see FIG. 2). When the conveyor screw 320 rotates so as to convey the toner to the toner outlet 30, the toner is supplied from the toner container 17 to the corresponding developing unit 122 through the pipe 310. Therefore, the amount of toner supplied from the toner container 17 to the developing unit 122 is determined according to the rotation amount of the conveyor screw 320.

Here, the driving motor 60 and the gear mechanism 18 engaged therewith will be described. The driving motor 60 is for example a direct current (DC) brushed motor, which generates a rotational driving force when DC is supplied thereto.

As shown in FIG. 5, the pinion 62 is attached to the output shaft 61 of the driving motor 60. The drive gear 18A is a stepped gear including a minor gear 181 and a major gear 182. The minor gear 181 is concentric with the major gear 182 and rotates interlocked therewith, and is meshed with the pinion 62 of the driving motor 60. The drive gear 18A is made to rotate by the rotational driving force of the driving motor 60.

The major gear 182 of the drive gear 18A includes, along the circumferential edge, a toothed portion 182a including a plurality of teeth to be meshed with the slave gear 18B so as to transmit the driving force of the driving motor 60 to the slave gear 18B, and a toothless portion 182b without the tooth and hence unable to mesh with the slave gear 18B. In this embodiment, the toothless portion 182b is located at one position on the circumferential edge of the major gear 182 of the drive gear 18A. However, the number of toothless portions 182b provided on the major gear 182 is not specifically limited.

While the rotational driving force of the driving motor 60 is transmitted to the slave gear 18B via the toothed portion 182a and hence the rotational driving force of the driving motor 60 is transmitted to the first stirring paddle 38, the second stirring paddle 40, and the conveyor screw 320, the driving motor 60 is in a loaded state. Accordingly, the toner container 17 is driven and the toner is supplied to the corresponding developing unit 122.

In contrast, at the toothless portion 182b the rotational driving force of the driving motor 60 is not transmitted to the slave gear 18B and hence the drive gear 18A runs idle and the driving motor 60 becomes unloaded. When the driving motor 60 is unloaded, the toner container 17 is not driven and therefore the toner is not supplied to the developing unit 122.

When the driving motor 60 is working, the loaded state and the unloaded state of the driving motor 60 are alternately repeated. When DC is continuously supplied to the driving motor 60, the driving motor 60 becomes unloaded once per every rotation of the drive gear 18A. In this embodiment, the number of times that the driving motor 60 becomes unloaded and the number of rotations of the drive gear 18A are equal to each other.

Figure 6:
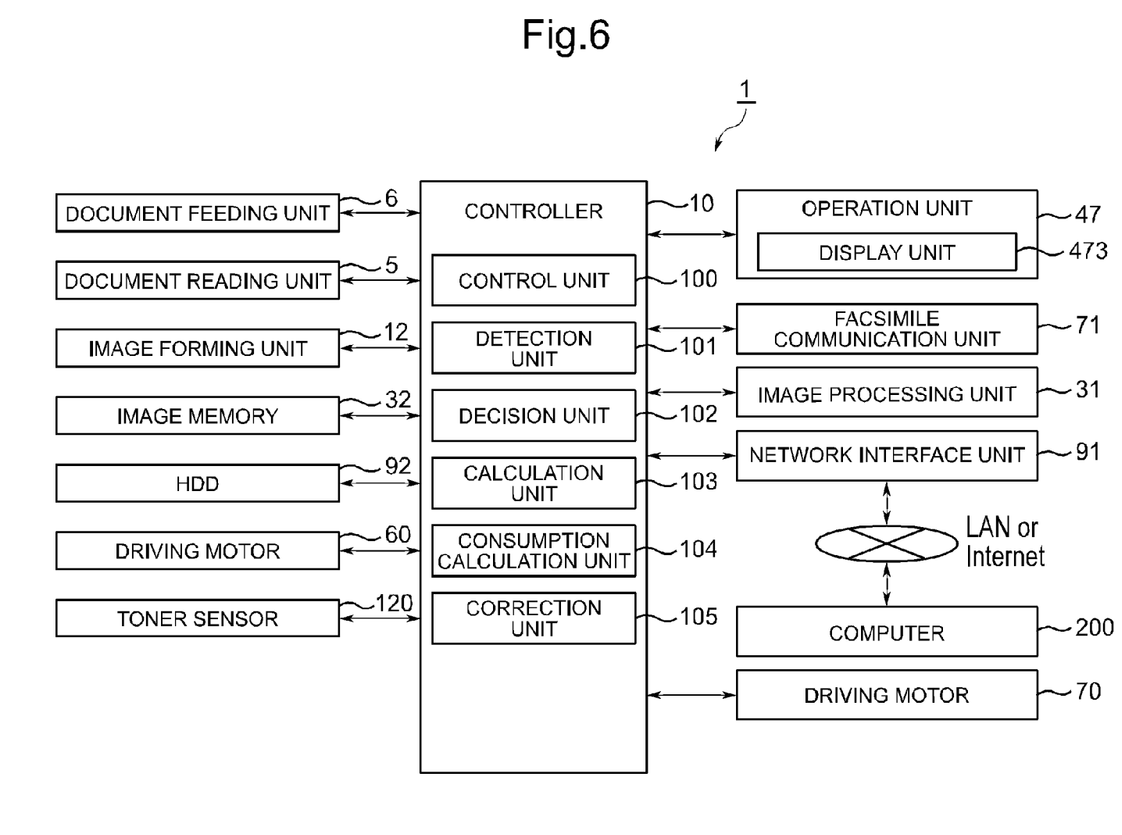
FIG. 6 is a functional block diagram showing an internal configuration of the image forming apparatus.

A configuration of the image forming apparatus 1 will now be described hereunder. FIG. 6 is a functional block diagram showing an internal configuration of the image forming apparatus 1.

The image forming apparatus 1 includes a controller 10. The controller 10 includes, though not shown, a central processing unit (CPU), a RAM, a ROM, and exclusive hardware circuits, and serves to manage the overall operation of the image forming apparatus 1.

The document reading unit 5 includes a reading mechanism 163 including a light emitter and a CCD sensor, to be controlled by the controller 10. The document reading unit 5 illuminates the source document with the light from the light emitter and detects the reflected light with the CCD sensor, to thereby read the image on the source document.

An image processing unit 31 processes the image data read by the document reading unit 5, as necessary. For example, the image processing unit 31 performs a predetermined image processing such as shading with respect to the image read by the document reading unit 5 so as to improve the quality of the image to be formed by the image forming unit 12.

An image memory 32 is a region for temporarily storing the image data of the source document acquired by the document reading unit 5, and data to be printed by the image forming unit 12.

The image forming unit 12 forms the image based on the image data acquired by the document reading unit 5, and print data received from a computer 200 connected to a network.

The operation unit 47 accepts instructions inputted by a user with respect to the operations and processes that the image forming apparatus 1 is capable of performing. The operation unit 47 includes a display unit 473.

The display unit 473 displays an operation screen, a preview screen, a job status check screen, and so forth, when the image forming apparatus 1 is in a normal operation mode. When the image forming apparatus 1 is in a sleep mode, the display unit 473 is turned off.

A facsimile communication unit 71 includes, though not shown, an encoding/decoding unit, a modem, and a network control unit (NCU), to perform facsimile transmission through a public circuit.

A network interface unit 91 includes a communication module such as a LAN port, to transmit and receive data to and from the computer 200 in the local area, through the LAN connected to the network interface unit 91.

A hard disk drive (HDD) 92 is a large-capacity storage device for storing source image acquired by the document reading unit 5 and so on.

A driving motor 70 is a drive source that provides a rotational driving force to rotating components of the image forming unit 12 and transport roller pairs 19.

The driving motor 60 is, as already described, the drive source that drives the toner containers 17M, 17C, 17Y, and 17Bk.

A toner sensor 120 is provided in each of the developing units 122M, 122C, 122Y, and 122Bk, to detect toner density in the corresponding developing unit 122.

For example, the control unit 100 decides whether to start the supply of the toner to the developing units 122M, 122C, 122Y, and 122Bk, on the basis of the detection signal from the toner sensor 120. Upon deciding that the toner supply has to be started, the control unit 100 starts to supply DC to the driving motor 60 to thereby activate the driving motor 60.

The controller 10 includes the control unit 100, a detection unit 101, a decision unit 102, a calculation unit 103, a consumption calculation unit 104, and a correction unit 105.

The control unit 100 is connected to the document reading unit 5, the document feeding unit 6, the image processing unit 31, the image memory 32, the image forming unit 12, the operation unit 47, the facsimile communication unit 71, the network interface unit 91, the HDD 92, the driving motor 60, and the toner sensor 120, and serves to control the operation of the cited functional units.

The detection unit 101 detects the driving current being supplied to the driving motor 60, when the driving motor 60 is working.

Figure 7:
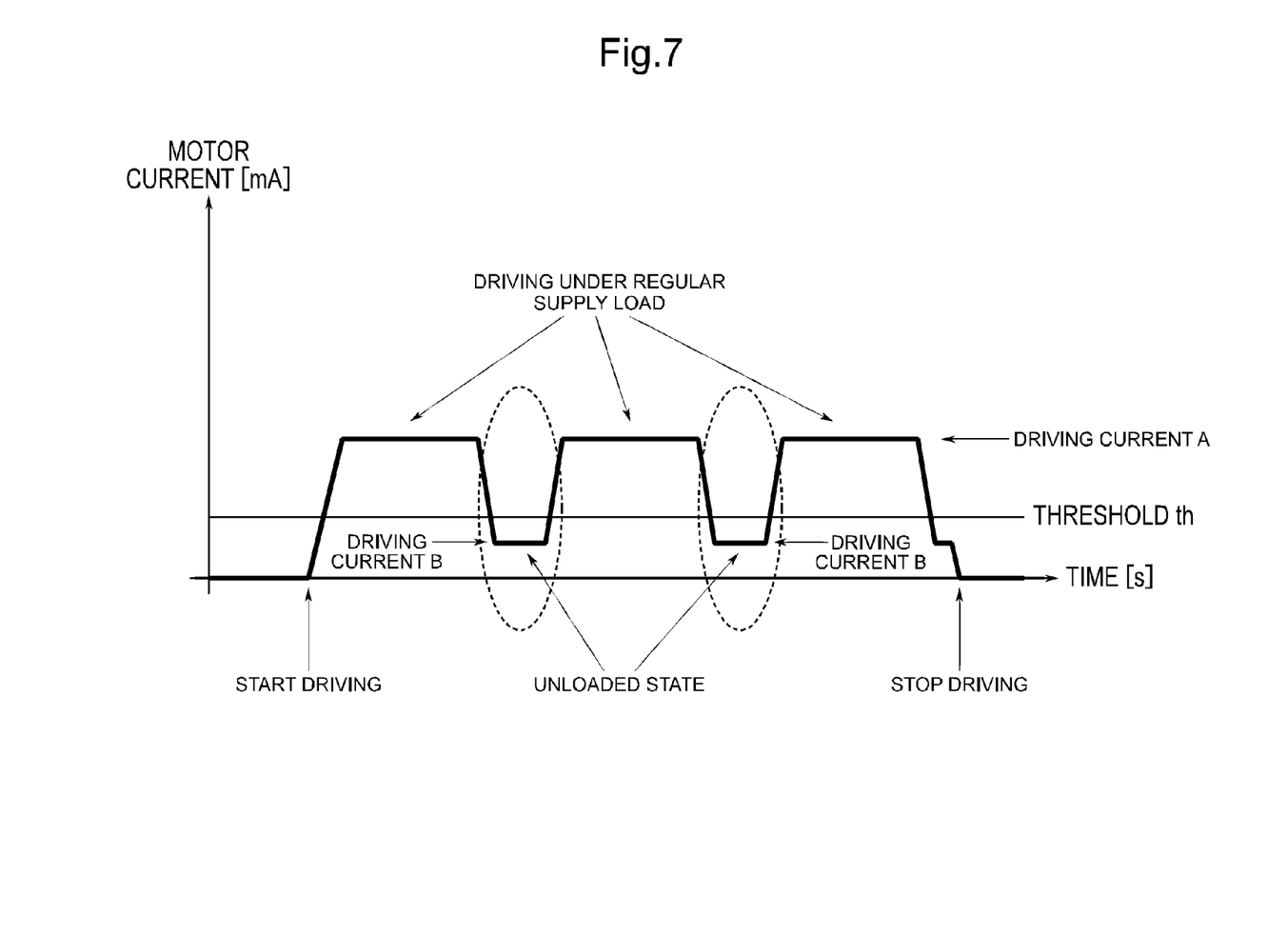
FIG. 7 is a graph showing changes with time of a current running through the driving motor.

The decision unit 102 decides whether the driving current for the driving motor 60 detected by the detection unit 101 is lower than a predetermined threshold. The predetermined threshold th is set, for example, to a value slightly higher than a driving current B of the driving motor 60 corresponding to the torque in the unloaded state counted in advance, as shown in FIG. 7 to be subsequently referred to, but lower than the driving current A of the driving motor 60 in the loaded state.

The calculation unit 103 counts the number of times that the decision unit 102 has decided that the driving current for the driving motor 60 is lower than the threshold, and calculates an amount of movement (in this embodiment, the number of rotations) of the slave gear 18B connected to the driving motor 60, on the basis of the number of times counted.

The consumption calculation unit 104 calculates, on the basis of the image data, the amount of toner consumed for the image forming operation from the image data performed by the image forming unit 12.

The correction unit 105 corrects the amount of the toner to be supplied to the developing unit 122 on the basis of the amount of movement of the slave gear 18B calculated by the calculation unit 103, utilizing a coefficient based on the toner consumption calculated by the consumption calculation unit 104.

Here, the calculation unit 103 and the consumption calculation unit 104 constitute parts of the constituents of the image forming apparatus 1 provided that these units are employed in a process to be subsequently described.

FIG. 7 is a graph showing changes with time of the current running through the driving motor 60. As described above, when DC is continuously supplied to the driving motor 60, the loaded state and the unloaded state of the driving motor 60 are alternately repeated. In other words, when the driving motor 60 starts to operate the toothed portion 182a of the drive gear 18A and the slave gear 18B are meshed with each other, so that the driving current for the driving motor 60 increases to the driving current A in the loaded state, and then the motor current proportionate to the extent of the load runs for a predetermined period of time (drive under regular supply load).

When the toothless portion 182b of the drive gear 18A meets the slave gear 18B and the drive gear 18A runs idle, the driving current for the driving motor 60 decreases to the value in the unloaded state (driving current B). Thereafter, the drive under the regular supply load and the drive under the unloaded state are alternately repeated.

The driving current for the driving motor 60 can be detected by the detection unit 101, for example by measuring the voltage between both ends of a non-illustrated current detection resistor. Accordingly, the decision unit 102 detects a temporary decrease in motor current in the unloaded state, thereby deciding whether the driving current for the driving motor 60 detected by the detection unit 101 is lower than the threshold th.

The calculation unit 103 counts the number of times that the driving current for the driving motor 60 was lower than the threshold according to the decision result provided by the decision unit 102, and calculates the amount of movement of the slave gear 18B on the basis of the number of times. In this embodiment, as already described, the number of times that the driving motor 60 undergoes the unloaded state and the number of rotations of the drive gear 18A are equal to each other, and therefore the calculation unit 103 may calculate the number of times that the driving current for the driving motor 60 was lower than the threshold as the value equal to the amount of movement, i.e., the number of rotations, of the drive gear 18A.

In the case where a plurality of toothless portions 182b are provided on the major gear 182, the calculation unit 103 can calculate the amount of movement of the drive gear 18A in steps less than one rotation thereof, since the number of times that the driving motor 60 undergoes the unloaded state and the number of rotations of the drive gear 18A are proportionate to each other. In this embodiment, thus, the amount of movement of the drive gear 18A can be accurately calculated from the number of times that the driving motor 60 has undergone the unloaded state.

The calculation unit 103 then calculates the number of rotations of the slave gear 18B, for example on the basis of the number of rotations of the drive gear 18A and the ratio between the number of teeth of the drive gear 18A and that of the slave gear 18B.

Here, the control unit 100 stops the rotation of the driving motor 60 at the time point that the driving current for the driving motor 60 has fallen below the threshold (the decision unit 102 has decided that the driving current for the driving motor 60 is below the threshold). Stopping thus the driving motor 60 in the unloaded state allows the calculation unit 103 to accurately count the number of times that he decision unit 102 has decided that the driving current for the driving motor 60 is below the threshold when the driving motor 60 is again activated, thereby enabling the calculation unit 103 to accurately calculate the amount of movement of the drive gear 18A and the slave gear 18B.

It is preferable that the calculation of the amount of movement of the drive gear 18A and the slave gear 18B, performed as above by the detection unit 101, the decision unit 102, and the calculation unit 103, is performed with respect to each of the driving motors 60 provided in the toner containers 17M, 17C, 17Y, and 17Bk.

Further, the calculation unit 103 calculates the toner supply amount from the toner containers 17M, 17C, 17Y, and 17Bk to the respective developing units 122M, 122C, 122Y, and 122Bk on the basis of the number of times that the driving current for the driving motor 60 has fallen below the threshold. In this case, the calculation unit 103 may directly utilize the amount of movement, i.e., the number of rotations of the slave gear 18B, or a value obtained by multiplying the amount of movement, i.e., the number of rotations of the slave gear 18B by a coefficient, to calculate the toner supply amount. Since the amount of movement of the drive gear 18A can be accurately detected in this embodiment, the amount of movement of the slave gear 18B and the toner supply amount of each color can also be accurately calculated. Therefore, the amount of movement of the object to be rotated by the driving force of the driving motor 60, in this embodiment the conveyor screw 320, can be accurately detected. Consequently, the control unit 100 can properly adjust the toner supply amount by controlling the rotation of the driving motor 60 according to the amount of movement of the slave gear 18B, with respect to each of the toner containers 17M, 17C, 17Y, and 17Bk.

Since the toner supply amount of each color can thus be accurately calculated, the control unit 100 can calculate the remainder of the toner in each of the toner containers 17M, 17C, 17Y, and 17Bk more accurately than general apparatuses, on the basis of the toner supply amount that has been calculated. Accordingly, the user can be notified that the toner container 17 is about to be empty, and therefore a sudden exhaustion of the toner can be prevented.

To adjust the toner supply amount from a toner container to a corresponding developing unit in the general image forming apparatuses, the driving time of the driving motor is varied on the premise that the driving time is proportional to the toner supply amount, so as to maintain the toner supply amount, and hence the amount of toner in each developing unit, at a constant level. In a color printer such as the image forming apparatus 1, the toner supply control of each color is performed by controlling the driving time of the driving motor, for example by alternately repeating the ON and OFF every 500 milliseconds.

In this case, however, the driving load for each of the toner containers is different and hence driving each motor for the same length of time does not result in rotation of the first stirring paddle, the second stirring paddle, and the conveyor screw of each color by the same amount. Therefore, the toner supply amount is unable to be constant because of the difference in driving load of each color, and the time that the desired supply of the toner is completed also becomes different for each color.

The foregoing general apparatus A is configured to supply the toner only while the torque is normal, and stop the supply of the toner when the torque becomes abnormal, to thereby supply a predetermined amount of toner. However, in the case where the toner density sensor in the developing unit is located away from the toner container, it takes a certain length of time before the correct detection result of the toner density in the developing unit is obtained upon supplying the toner. Therefore, stopping the toner supply after the torque of the driving motor largely fluctuates as does the general apparatus A may result in excessive supply of the toner from the toner container to the developing unit, compared with the desired toner supply amount.

In addition, the general apparatus A is only intended to suspend the toner supply for a predetermined period of time in case that the toner is unexpectedly supplied to the developing unit, and is not configured to accurately calculate the amount of toner supplied from the toner container to the developing unit taking the torque of the driving motor into account.

Further, in the case of employing a rotation speed detector such as an encoder as in the foregoing general apparatus B, the amount of rotation (amount of movement) of the motor in which the torque factor is incorporated can be detected, however employing the rotation speed detector leads to an increase in cost.

In this embodiment, in contrast, the control unit 100 utilizes, when adjusting the toner supply amount to the developing unit 122, the number of times that the driving current for the driving motor 60 has fallen below the threshold, instead of the driving time of the driving motor 60. Therefore, the toner supply amount can be accurately adjusted, accurately reflecting the basis of the actual number of rotations of the drive gear 18A and the slave gear 18B, regardless of the difference in driving load with respect to each color.

As described thus far, the configuration according to this embodiment enables the amount of movement realized by the driving motor 60 to be accurately detected with the torque factor of the driving motor 60 incorporated, at a relatively low cost without the need to employ a rotation speed detector such as an encoder. Therefore, the amount of movement of the object to be rotated by the driving force of the driving motor 60, for example the slave gear 18B, can be accurately detected without the need to employ an additional mechanism, and consequently an accurate amount of toner can be supplied from the toner container 17 to the developing unit 122.

Here, although the amount of movement realized by the driving motor 60 is the same, the amount of toner actually supplied to the developing unit 122 may become different depending on the amount of toner remaining in the toner container 17. In such a case, the consumption calculation unit 104 may calculate the total number of dots and cumulative toner consumption corresponding thereto, on the basis of all the image data thus far used by the image forming unit 12, and the correction unit 105 may correct the toner supply amount calculated by the calculation unit 103 using a coefficient based on the calculated toner consumption. Such an arrangement allows the toner supply amount to be more accurately calculated.

Further, there are cases where the variation of the toner supply amount based on the cumulative amount of movement of the toner container 17 is known in advance. In such cases, determining a coefficient corresponding to the variation and correcting the toner supply amount calculated by the calculation unit 103 with the coefficient allows the total toner supply amount to be accurately presumed on the basis of the cumulative number of times of the unloaded state of the driving motor 60 after installing a new toner container 17. Consequently, stable supply of the toner can be realized.

The image forming apparatus according to the disclosure may be modified in various manners from the foregoing embodiment. For example, although the drive gear 18A includes the toothless portion 182b in the foregoing embodiment, the toothless portion may be provided on either of the drive gear 18A and the slave gear 18B. For example, the slave gear 18B may include the toothless portion and the drive gear 18A may only have the toothed portion 182a over the entire circumferential edge. In this case also, the driving current for the driving motor 60 becomes the driving current B corresponding to the torque in the unloaded state as described above when the toothed portion 182a of the drive gear 18A meets the toothless portion of the slave gear 18B. Therefore, the decision unit 102, the calculation unit 103, the consumption calculation unit 104, and the correction unit 105 can correct the toner supply amount from the toner container 17 to the developing unit 122 on the basis of the amount of movement of the slave gear 18B.

In the case, for example, where the gear mechanism 18 includes a plurality of slave gears 18B and one of the slave gears 18B includes the toothless portion, the amount of movement of the plurality of slave gears 18B and the toner consumption can equally be calculated, and the toner supply amount from the toner container 17 to the developing unit 122 can be corrected on the basis of the amount of movement of the slave gears 18B.

Alternatively, the gear mechanism 18 may include a plurality of slave gears 18B that only have the toothed portion along the circumferential edge, and the drive gear 18A may include both the toothed portion 182a and the toothless portion 182b. In this case, the amount of movement of each of the slave gears 18B can be calculated as described below.

For example, the decision unit 102 may decide whether the driving current for the driving motor 60 is below the threshold. The calculation unit 103 may count the number of times that the decision unit 102 has decided that the driving current is below the threshold. The calculation unit 103 may then calculate the amount of movement of each of the slave gears 18B on the basis of the gear ratio of the slave gears 18B with respect to the drive gear 18A, on the premise that the drive gear 18A makes one rotation when the number of times counted reaches the number of the slave gears 18B.

Alternatively, the gear mechanism 18 may include the drive gear 18A only having the toothed portion 182a and a plurality of slave gears 18B, two or more of which may include both the toothed portion and the toothless portion along the circumferential edge, and the two or more slave gears 18B having the toothless portion may have the same number of teeth.

In this case, the decision unit 102 may decide whether the driving current for the driving motor 60 is below the threshold, which is slightly higher than the driving current at the time that the toothless portions of one of the slave gears 18B having the toothless portion meets the drive gear 18A. The calculation unit 103 may count the number of times that the driving current has been decided to be below the threshold.

Here, in the case where the slave gears 18B having the toothless portion have the same number of teeth, the drop of the driving current indicating that the toothless portion has met the drive gear 18A occurs at the same period with respect to each of the slave gears 18B having the toothless portion (It is assumed here that the toothless portion of each of the slave gears 18B meets the drive gear 18A at different timing).

Accordingly, the decision may be made on the premise that all of the slave gears 18B having the toothless portion have made one rotation when the number of times reaches the number of the slave gears 18B having the toothless portion. Therefore, the calculation unit 103 may calculate the amount of movement of the slave gears 18B having the toothless portion and having the same number of teeth on the basis of the number of times counted, on the premise that all of the slave gears 18B having the toothless portion have made one rotation when the number of times reaches the number of the slave gears 18B having the toothless portion.

Thus, even when a plurality of slave gears 18B are meshed with the drive gear 18A, the amount of movement of each of the slave gears 18B having the toothless portion and having the same number of teeth can be accurately calculated.

Further, the gear mechanism 18 may include the drive gear 18A only having the toothed portion 182a and a plurality of slave gears 18B, two or more of which may include both the toothed portion and the toothless portion along the circumferential edge, and the slave gears 18B having the toothless portion may include those different in number of teeth from other slave gears 18B.

The decision unit 102 may decide, using thresholds set for each of the slave gears having the toothless portion and different in number of teeth, whether the driving current for the driving motor 60 is below the threshold with respect to each of the slave gears 18B. In the case where the respective toothless portions of the slave gears 18B meet the drive gear 18A at different timings, when the toothless portion of one of the slave gears 18B meets the drive gear 18A the toothed portions of the remaining slave gears 18B are meshed with the drive gear 18A. Therefore, the torque of the driving motor 60 at the time that the toothless portion of one of the slave gears 18B meets the drive gear 18A differs depending on the condition of the remaining slave gears 18B meshed with the drive gear 18A. Accordingly, the decision unit 102 may decide whether the driving current for the driving motor 60 is below the threshold with respect to each of the slave gears 18B having the toothless portion, utilizing the threshold set for each of those slave gears 18B. In this case, when the driving current drops below a plurality of thresholds the calculation unit 103 may count the number of times that the driving count has fallen below the threshold, only with respect to the lowest one of the thresholds below which the driving current has fallen. This also applies hereafter in the case where a plurality of thresholds are employed.

Therefore, the calculation unit 103 may count the number of times that the driving current has been decided to be below the threshold by the decision unit 12 with respect to each of the slave gears 18B having the toothless portion, and calculate the amount of movement of each of the slave gears 18B on the basis of the number of times thus counted. Such an arrangement also enables the amount of movement of each of the slave gears 18B having the toothless portion to be accurately calculated.

Further, description will be given about the case where the gear mechanism 18 includes the drive gear 18A only having the toothed portion 182a and a plurality of slave gears 18B, two or more of which have both the toothed portion and the toothless portion along the circumferential edge, and the toothless portions of the respective slave gears 18B meet the drive gear 18A at the same time. In this case, the decision unit 102 sets the thresholds in stages according to the number of slave gears 18B for the case where the toothless portions of two or more slave gears 18B meet the drive gear 18A at the same time, and decides whether the driving current is below the threshold with respect to each of the slave gears 18B. Here, when a larger number of toothless portions meet the drive gear 18A at the same time the drive gear 18A is subjected to a smaller load, and hence the driving current for the driving motor 60 is decreased. On the other hand, when a smaller number of toothless portions meet the drive gear 18A the drive gear 18A is subjected to a larger load and the driving current for the driving motor 60 is increased. In the case where different objects to be driven are connected to the respective slave gears 18B, the driving current for the driving motor 60 differs depending on the combination of the slave gears 18B having the toothless portion opposed to the drive gear 18A, when the toothless portions meet the drive gear 18A at the same time. Accordingly, the decision unit 102 may set the thresholds that are different depending on the combination of the slave gears 18B having the toothless portion. Then when the decision unit 102 decides that the driving current has fallen below the threshold, the calculation unit 103 may decide, by storing the relation between the thresholds and the combination in advance, with respect to which slave gear 18B the number of times should be counted on the basis of that relation, even when the plurality of toothless portions meet the drive gear 18A at the same time. Thus, the calculation unit 103 can count the number of times that the decision unit 102 has decided that the driving current is below the threshold with respect to each of the slave gears 18B having the toothless portion, and calculate the amount of movement of each of the slave gears 18B on the basis of the number of times counted as above. Such an arrangement enables the amount of movement of each of the slave gears 18B to be accurately calculated, even in the case where the plurality of toothless portions meet the drive gear 18A at the same time.

Although the image forming apparatus according to the disclosure is exemplified by the multifunctional peripheral in the foregoing embodiment, the disclosure may be applied to different electronic apparatuses including image forming apparatuses such as a printer, a copier, and a facsimile machine. In addition, the gear mechanism 18 shown in FIG. 5 may be applied to a driving system other than the toner container 17, to thereby accurately calculate the amount of movement of that driving system. Further, the gear mechanism 18 shown in FIG. 5 may be applied to a driving system provided in an apparatus other than the image forming apparatus, in which case the amount of movement of the driving system can equally be accurately calculated.

The specific configurations and processes described with reference to FIGS. 1 through 7 are merely exemplary embodiments of the disclosure, and the configurations and processes of the disclosure are in no way limited to those embodiments.

Various modifications and alterations of this disclosure will be apparent to those skilled in the art without departing from the scope and spirit of this disclosure, and it should be understood that this disclosure is not limited to the illustrative embodiments set forth herein.

What is claimed is;:

1. An electronic apparatus comprising:
  a driving motor that generates a rotational driving force;
  a gear mechanism including a drive gear made to rotate by the rotational driving force of the driving motor and a slave gear made to rotate by the rotational driving force of the driving motor by being meshed with the drive gear, to transmit the rotational driving force to an object to be driven by the driving motor, one of the drive gear and the slave gear including a toothless portion where the gear tooth is missing, the toothless portion being formed on a circumferential edge of the corresponding gear;
  a control unit that controls the driving motor;
  a detection unit that detects a driving current for the driving motor when the driving motor is activated;
  a decision unit that decides whether the driving current detected by the detection unit is lower than a predetermined threshold; and
  a calculation unit that counts a number of times that the decision unit has decided that the driving current is lower than the threshold, and calculates an amount of movement of the slave gear on the basis of the number of times counted.

2. The electronic apparatus according to claim 1, wherein a plurality of the slave gears are provided, the drive gear includes the toothless portion, and the calculation unit counts the number of times that the decision unit has decided that the driving current is lower than the threshold, and calculates the amount of movement of each of the slave gears on the basis of a gear ratio of each of the slave gears with respect to the drive gear, on the premise that the drive gear makes one rotation when the number of times reaches the number of the slave gears.

3. The electronic apparatus according to claim 1, wherein a plurality of the slave gears are provided, two or more of the slave gears include the toothless portion, the slave gears including the toothless portion have the same number of teeth, and the calculation unit counts the number of times that the decision unit has decided that the driving current is lower than the threshold, decides that all of the slave gears have made one rotation when the number of times reaches the number of the slave gears including the toothless portion, and calculates the amount of movement of each of the slave gears including the toothless portion and having the same number of teeth, on the basis of the number of times counted.

4. The electronic apparatus according to claim 1, wherein a plurality of the slave gears are provided, two or more of the slave gears include the toothless portion, the slave gears including the toothless portion include those different in number of teeth, the decision unit decides, using thresholds set for each of the slave gears having the toothless portion and different in number of teeth, whether the driving current is lower than the threshold with respect to each of the slave gears, and the calculation unit counts the number of times that the decision unit has decided that the driving current is lower than the threshold with respect to each of the slave gears including the toothless portion, and calculates the amount of movement of each of the slave gears on the basis of the number of times counted.

5. The electronic apparatus according to claim 1, wherein a plurality of the slave gears are provided, two or more of the slave gears include the toothless portion, the decision unit sets thresholds in stages for a case where the two or more slave gears become unloaded at the same time, according to the number of slave gears that have become unloaded at the same time, and decides whether the driving current is lower than the threshold with respect to each of the slave gears, and the calculation unit counts the number of times that the decision unit has decided that the driving current is lower than the threshold with respect to each of the slave gears including the toothless portion, and calculates the amount of movement of each of the slave gears on the basis of the number of times counted.

6. The electronic apparatus according to claim 1, wherein the control unit stops the driving motor at a time point that the decision unit has decided that the driving current is lower than the threshold.

7. An image forming apparatus comprising:

a driving motor that generates a rotational driving force;

a gear mechanism including a drive gear made to rotate by the rotational driving force of the driving motor and a slave gear made to rotate by the rotational driving force of the driving motor by being meshed with the drive gear, to transmit the rotational driving force to an object to be driven by the driving motor, one of the drive gear and the slave gear including a toothless portion where the gear tooth is missing, the toothless portion being formed on a circumferential edge of the corresponding gear;

a control unit that controls the driving motor;

a detection unit that detects a driving current for the driving motor when the driving motor is activated;

a decision unit that decides whether the driving current detected by the detection unit is lower than a predetermined threshold;

a calculation unit that counts a number of times that the decision unit has decided that the driving current is lower than the threshold, and calculates an amount of movement of the slave gear on the basis of the number of times counted;

an image forming unit that forms an image on a recording medium based on image data; and a toner container that supplies a toner to a developing unit provided in the image forming unit, wherein a rotating member provided in the toner container for conveying the toner in the toner container to the developing unit is made to rotate as the object to be driven, via the drive gear and the slave gear.

8. The image forming apparatus according to claim 7, wherein the calculation unit calculates an amount of the toner supplied from the toner container to the developing unit on the basis of the calculated amount of movement of the slave gear.

9. The image forming apparatus according to claim 8, further comprising:

a consumption calculation unit that calculates an amount of the toner consumed by the image forming unit for forming an image, on the basis of the image data; and a correction unit that corrects the toner supply amount calculated by the calculation unit using a coefficient based on the toner consumption calculated by the consumption calculation unit.

10. The image forming apparatus according to claim 7, wherein a plurality of the image forming units are provided for respective colors necessary for forming a colored image, the image forming units for the respective colors each include a toner container and a driving motor, and the control unit controls each of the driving motors for the toner containers of the respective colors, on the basis of the amount of movement of the slave gear calculated by the calculation unit with respect to each of the image forming units for the respective colors.

11. The image forming apparatus according to claim 7, wherein the control unit controls a rotation amount of the rotating member by controlling the driving motor on the basis of the amount of movement of the slave gear calculated by the calculation unit.

* * * * *